(12) United States Patent
Näsholm et al.

(10) Patent No.: US 12,545,631 B2
(45) Date of Patent: Feb. 10, 2026

(54) FERTILIZER COMPOSITION COMPRISING A ZEOLITE AND BASIC L-AMINO ACID

(71) Applicant: AREVO AB, Umeå (SE)

(72) Inventors: Torgny Näsholm, Umeå (SE); Jonas Öhlund, Umeå (SE); Mattias Holmlund, Umeå (SE)

(73) Assignee: AREVO AB, Umea (SE)

( * ) Notice: Subject to any disclaimer, the term of this patent is extended or adjusted under 35 U.S.C. 154(b) by 242 days.

(21) Appl. No.: 16/311,520

(22) PCT Filed: Jun. 22, 2017

(86) PCT No.: PCT/SE2017/050691
§ 371 (c)(1),
(2) Date: Dec. 19, 2018

(87) PCT Pub. No.: WO2017/222464
PCT Pub. Date: Dec. 28, 2017

(65) Prior Publication Data
US 2019/0194080 A1 Jun. 27, 2019

(30) Foreign Application Priority Data

Jun. 23, 2016 (SE) .................................. 1650904-4

(51) Int. Cl.
*C05D 9/00* (2006.01)
*A01C 21/00* (2006.01)
(Continued)

(52) U.S. Cl.
CPC ................ *C05D 9/00* (2013.01); *A01C 21/00* (2013.01); *A01G 17/00* (2013.01); *A01G 18/00* (2018.02); *A01G 22/00* (2018.02); *C05C 11/00* (2013.01)

(58) Field of Classification Search
CPC ............ C05C 11/10; C05C 11/00; C05D 9/00; A01C 21/00; A01G 22/00; A01G 18/00;
(Continued)

(56) References Cited

U.S. PATENT DOCUMENTS

| 5,314,852 A | 5/1994 | Klatte |
| 2008/0044548 A1* | 2/2008 | Hale, III .................. A23L 1/20 426/630 |

(Continued)

FOREIGN PATENT DOCUMENTS

| CN | 105110941 A | 12/2015 |
| CN | 105175139 A | 12/2015 |

(Continued)

OTHER PUBLICATIONS

Xu et al, "Research Advance in Nitrogen Metabolism of Plant and Its Environmental Regulation", Ying Yong Sheng Tai Xue Bao. Mar. 2004;15(3):511-6. Chinese. PMID: 15228008, accessed from https://pubmed.ncbi.nlm.nih.gov (Year: 2004).*

(Continued)

*Primary Examiner* — Jennifer A Smith
(74) *Attorney, Agent, or Firm* — Porter Wright Morris & Arthur LLP

(57) ABSTRACT

The present invention relates to the promotion of the growth of at least one plant by providing a fertilizer composition-comprising at least one zeolite, into the pores of which at least one basic L-amino acid has been adsorbed; adding the fertilizer composition to a medium for plant growth; and culturing a plant therein. The invention will provide the release of nitrogen from the fertilizer composition during culture of the plant at a rate which is advantageously used by the plant. The invention also relates to a fertilizer composition as such, optionally combined with a medium for plant growth to make up a growth-promoting material. The inven-
(Continued)

tion is advantageously used to reduce the resources required in the fertilization of slowly growing plants, where repeated supply of nutrients as well as leakage of nitrogen amounts to large costs to society.

23 Claims, 17 Drawing Sheets

(51) Int. Cl.
*A01G 17/00* (2006.01)
*A01G 18/00* (2018.01)
*A01G 22/00* (2018.01)
*C05C 11/00* (2006.01)

(58) Field of Classification Search
CPC ........ A01G 17/00; A01G 20/00; A01G 18/10; A01G 7/06; A01G 22/20; C05F 11/10
See application file for complete search history.

(56) References Cited

U.S. PATENT DOCUMENTS

| | | | |
|---|---|---|---|
| 2011/0072872 A1* | 3/2011 | Hartle | C05F 11/02 71/27 |
| 2012/0097194 A1* | 4/2012 | McDaniel | A01N 63/10 134/26 |
| 2015/0087517 A1* | 3/2015 | Verheesen | A01N 25/28 504/206 |

FOREIGN PATENT DOCUMENTS

| | | |
|---|---|---|
| CN | 105198679 A | 12/2015 |
| CN | 105565970 A | 5/2016 |
| SU | 1510781 A1 | 9/1989 |
| WO | 2005/075602 A1 | 8/2005 |
| WO | 2012037352 A2 | 3/2012 |
| WO | 2015/030656 A1 | 3/2015 |
| WO | 2015/066691 A1 | 5/2015 |
| WO | 2016/035090 A1 | 3/2016 |

OTHER PUBLICATIONS

Department of Forestry (DOF), "How to Fertilizer Shade Trees", 2014, accessed from http://www.dof.virginia.gov/tree/care/how-to-fertilize.htm (Year: 2014).*
Petruzzello, "List of Plants in the Family Poaceae", 2015, accessed from https://www.britannica.com/topic/list-of-plants-in-the-family-Poaceae-2036227 (Year: 2017).*
Quezada Rivera ("Biosynthetically Produced Amino Acid Byproducts Can Replace Nitrogen Fertilizers for Corn Production", Graduate Theses and Dissertations, 2015, accessed from https://lib.dr.iastate.edu/etd/14596 (Year: 2015).*
Britannica, The Editors of Encyclopaedia ("Monocotyledon", Encyclopedia Britannica, 2014, accessed from www.britannica.com, referenced hereinafter as "Britannica") (Year: 2014).*
Koelling, M. R., and Randall B. Heiligmann. "Recommended species for Christmas tree plantings in the North Central United States." North Central regional extension publication (USA) (1993). (Year: 1993).*
Stahnke, G. K., et al. "Home lawns,(revised) Washington State University Extension Bulletin 0482." (2000). (Year: 2000).*
Supplementary European Search Report dated Jan. 15, 2020 from corresponding European Application No. 17815820.0. Jan. 15, 2020.
Block, Richard J., Separation of Basic Amino Acids, Chapter 14 from Ion Exchange, Theory and Application, 1st Edition, Nachod, Editor, Elsevier (2012), pp. 295-314.
Krohn, John E. et al., Phenylalanine and Arginine Adsorption in Zeolites X, Y, and B, Langmuir, vol. 22, pp. 9350-9356 (2006).
Weckhuysen, Bert M. et al, Zeolite-Encapsulated Copper(II) Amino Acid Complexes: Synthesis, Spectroscopy, and Catalysis, J. Phys. Chem., 100:9456-9461 (1996).

* cited by examiner

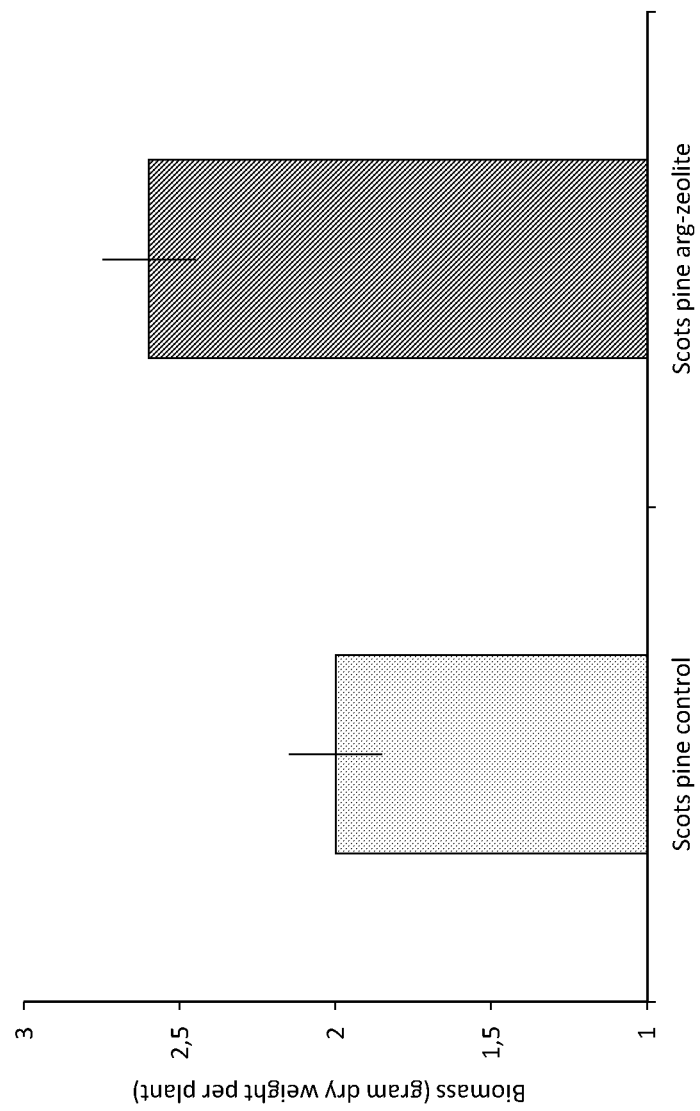

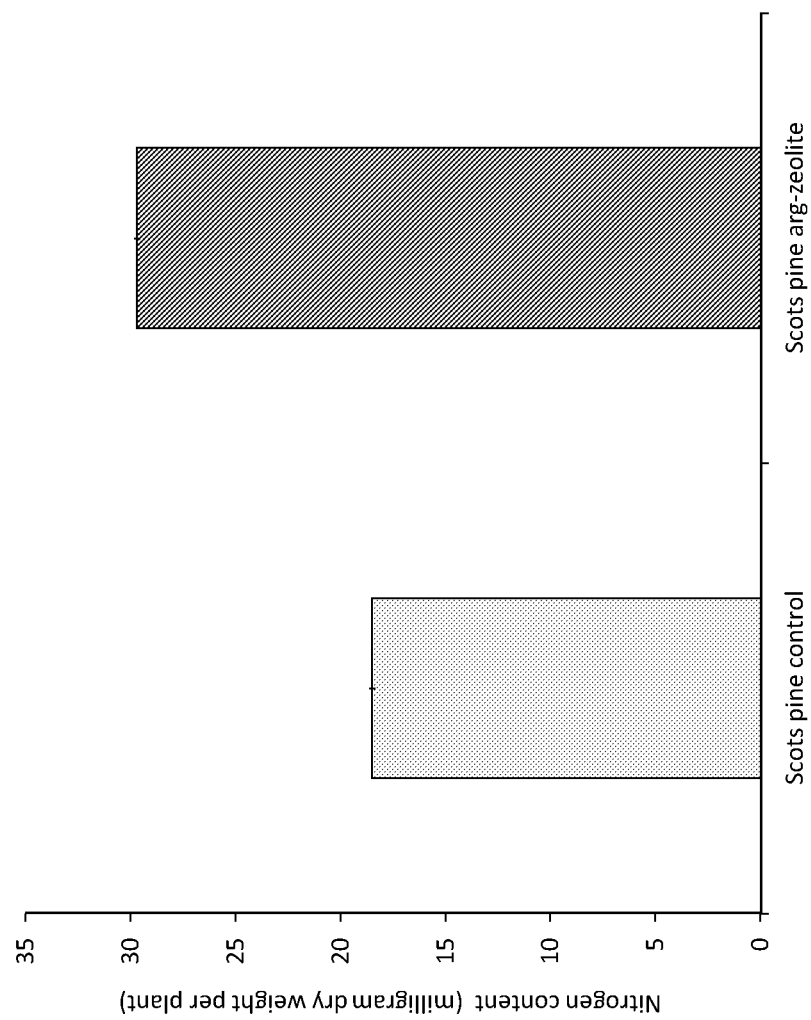

Figure 5
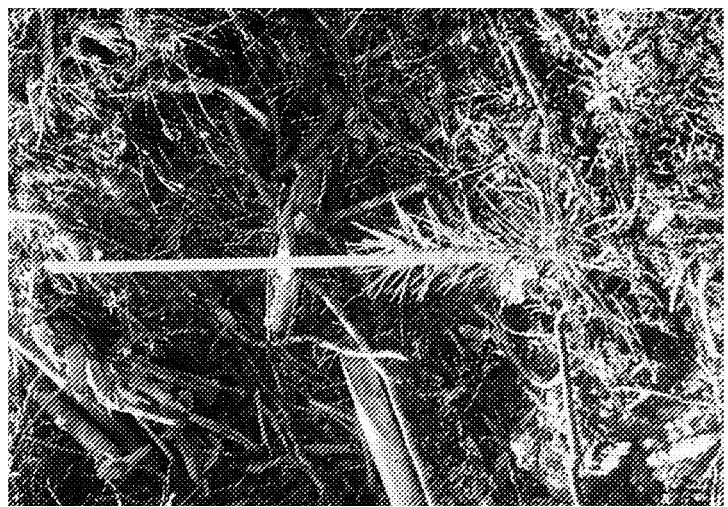

Figure 11A-C
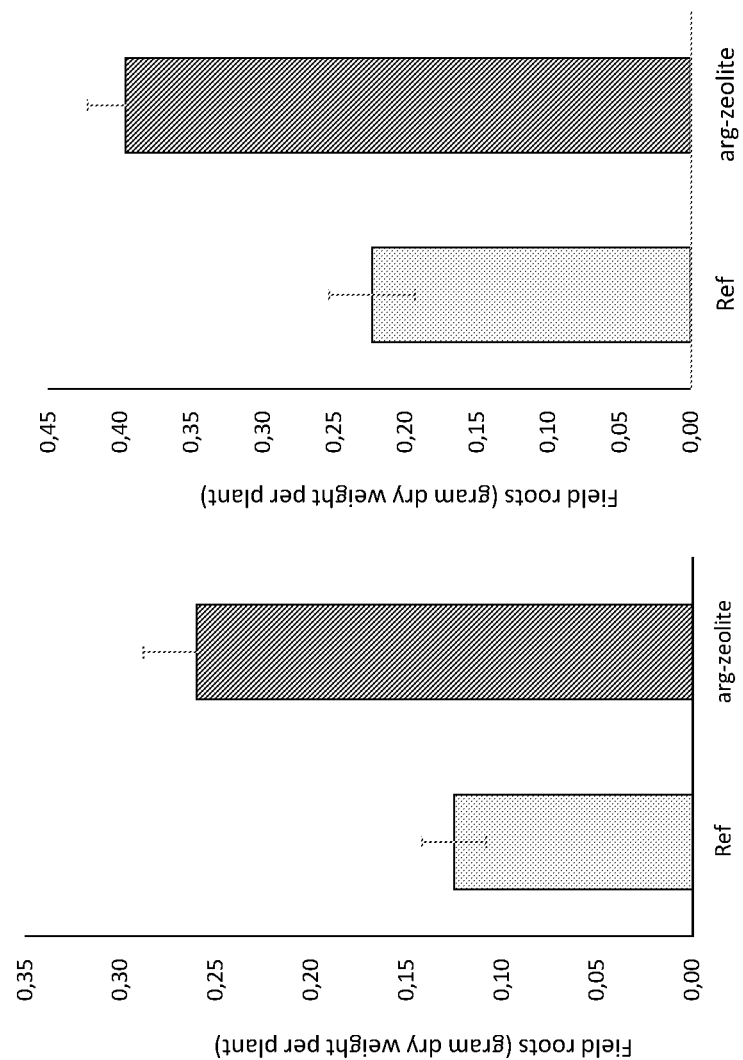
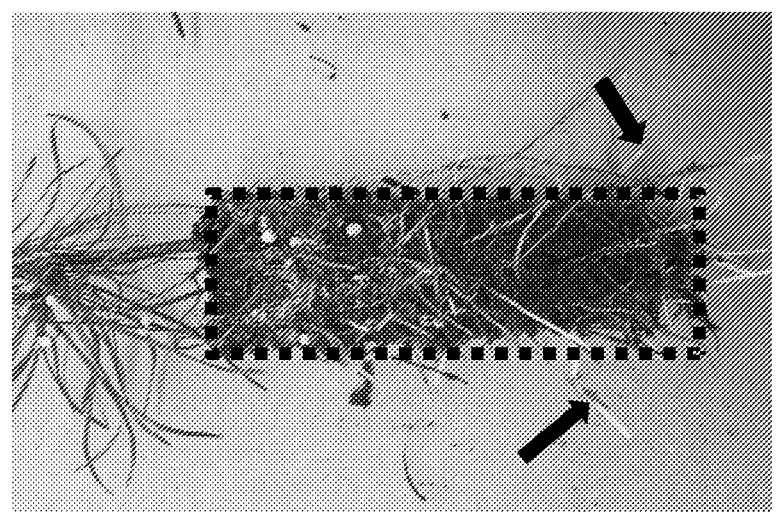

FERTILIZER COMPOSITION COMPRISING A ZEOLITE AND BASIC L-AMINO ACID

TECHNICAL FIELD

The present invention relates to a fertilizer composition and its use for providing release of nitrogen to plants. More specifically, the invention relates to a method of providing nitrogen to growing plants at a rate which corresponds to the nitrogen demand of said plant.

BACKGROUND

Methods of improving soil and/or growth conditions have in principle been applied since the first days of agriculture and horticulture. Starting with a very limited understanding of mechanisms, it was recognised that the waste from household animals such as cows could improve the growth of crops in the fields. As nitrogen, potassium and phosphorus were identified as the key components required to efficiently fertilize soil, commercial preparations became widely available and the principle of more is less was generally applied for decades, resulting in the by now well-known over fertilization effects. While preparations including nitrogen, potassium and phosphorus together with various other mineral nutrients still constitute the standard in most plant culture, research is continuously improving with regard to the refinement of fertilizer compositions that provide plants with what they need for optimal growth. Specifically designed compositions for certain plants have been developed, and different formats such as liquids and dry preparations are also provided in order to balance a desired growth, feasibility of application and a minimal environmental impact.

One way of decreasing the harmful environmental effects of fertilizers, and especially the losses of mineral nutrients to recipient ecosystems, is to develop compositions which provide a slow or delayed release of active component(s). Such compositions are often referred to as slow release or controlled-release preparations.

Coating of mineral nutrient salts has been proposed as one way of slowing down such release. However, as a common mechanism, coatings often act to delay all release rather than slowing down the rate of release of nutrients enclosed therein. Thus, in the early stages, a coating may prevent any and all release of nutrient, and once the preparation is 'opened up' or the coating has been consumed, the nutrients will all be available at once. Thus, at that point, the released nutrients will either be utilized by the cultured plant, or, if the amount is larger than needed, leak to the environment will be the result. A general challenge with coating technology is therefore to provide for a release which is extended in time, and with a rate suitable for the needs of the cultured plant.

WO 2015/066691 (University of Florida Research Foundation) relates to slow-release fertilizer compositions wherein graphene oxide films are utilized to delay release. More specifically, the described fertilizer composition comprises a plurality of fertilizer particles and a reduced-graphene oxide layer disposed on the surface of each particle. The fertilizer particles may comprise one or more of nitrogen, phosphorus, potassium, calcium, magnesium and sulphur, boron, chlorine, cupper, iron, manganese, molybdenum, zinc and nickel, wherein at least one is in salt form and can act to reduce graphene oxide. The described coating technology is stated to provide great promise for environmentally-benign controlled-release fertilizers for crop production.

An alternative way suggested for optimised release of nutrients to plants is to create complexes thereof. WO 2016/035090 (Chaudhry) relates to such a fertilizer composition and a process for its preparation. More specifically, a multifunctional organic bio-complexed composition is described, which comprises nutrient sources, such as nitrogen, phosphorus and potassium, and phosphopeptides, such as phosphopeptides comprising a complexation product of organic acids:biocomplexing agent together with a phosphorous source. The bio-complexing agents may be peptides, amino acids or hydrolysed proteins. As compared to conventional fertilizers using nitrogen from urea, which is stated to evaporate quickly, the described complexation of nitrogen to cations is proposed to increase the efficiency. In the area of agriculture, due to their high mineral content, microporous aluminosilicate materials known as zeolites have been suggested for their soil-enhancing properties. For example, Frederick A. Mumpton (in La coca magica: Uses of natural zeolites in agriculture and industry; *Proc. Natl. Acad. Sci. USA*, Vol. 96, pp. 3463-3470, March 1999, Colloquium Paper) proposed the addition of the natural zeolite clinoptilite to soil along with standard fertilizer in order to delay the release of ammonium thereof.

As zeolites are cation-exchangers, they may advantageously be used e.g. in water purification, and in particular in water softening. In sodium zeolite softening, water containing scale-forming ions, such as calcium and magnesium, will pass through a resin bed wherein the hard ions are exchanged for sodium ions, which will diffuse into the bulk water solution. The hardness-free water can be used for boiler feed water, for reverse osmosis system makeup, and in various chemical processes.

Zeolites have also been studied as an alternative to organic ion exchangers for the separation of amino acids, especially in the production thereof by extraction, synthesis or fermentation.

F. C. Nachod (in Ion Exchange: Theory and Application, Elsevier, 2 Dec. 2012, Chapter II (Separation of basic amino acids) has shown that neutral and acidic amino acids are efficiently extracted from zeolites using standard extraction procedures and media, but that basic amino acids, in particular arginine and lysine were so strongly bound to the zeolites that they were more or less immobile.

Further, Nelson et al. state that efficient extraction of arginine and lysine bound to a Delcaso (i.e. a zeolite) column could only be achieved with a strong acid (2N HCl), while all other amino acids were efficiently extracted with pyridine.

Finally, WO 2005/075602 (Balance Agri-Nutrients Ltd) relates to fertilizer compositions, and more specifically to a composition in the form of a particulate zeolite carrying at least one nitrification inhibitor. Thus, an objective of WO 2005/075602 is to reduce the loss of nitrates to the environment by inhibiting the conversion of ammonium to nitrite and nitrate. One illustrative fertilizer composition according to WO 2005/075602 comprises 10% of fertilizer, such as urea, 10-70% of zeolite, and 1-45% of nitrification inhibitors.

However, considering the many different plants and growth conditions that exist in consumer use as well as on a commercial scale, and in order to meet the increasing demands of minimizing the environmental effects of fertilizer compositions, there is still a need of alternative methods and products to support effective culture of plants.

SUMMARY OF THE INVENTION

One object of the invention is to provide a method for fertilizing a medium for plant growth with a minimal loss of nitrogen.

An additional object of the invention is to provide such a method, which has effect of fertilized plants during a prolonged period of time.

A specific object of the invention is to provide a format for the administration of organic nitrogen to growing plants, which format provides protection for the nitrogen e.g. from microbial utilization.

A further object of the invention is to provide on demand fertilization of plants, wherein the plant activity controls the release of nitrogen from a fertilizer composition.

The objects above may be achieved as described in the appended independent claims.

Further embodiments, details and advantages of the invention will appear from the dependent claims as well as from the detailed description and experimental part below.

Definitions

The term "plant" is used herein in a broad sense to denote a species or kind of plant.

The term "to promote" growth of the plant is used broadly herein, including to provide for or to enhance i.e. improve the growth of any or all parts of the plant.

The term "amino acid" as used herein includes derivatives or modified forms thereof.

The term "zeolite" means a microporous aluminosilicate mineral, and includes natural as well as synthetic such materials.

In the context of the zeolite used according to the invention, the term "adsorbed" is used in its broad context including any chemical interaction and/or binding principle that provides attachment.

The term "mushroom" is used herein to denote the fleshy, spore-bearing fruiting body of a fungus, typically produced above ground on soil or other medium for plant growth.

The term "field roots" is defined as roots growing in the field, outside the peat plug from the pot.

The term "a medium for plant growth" is used herein in its broadest context, and may include e.g. peat, clay, sand soil of various compositions, dirt and any combinations thereof which are deemed suitable or desired for the culture of a plant.

BRIEF DESCRIPTION OF DRAWINGS

FIGS. 4A-B shows the shoot growth by biomass (4A) and total nitrogen content (4B), respectively, of Scots pine seedling with (right) and without (left) added arginine-charged zeolite according to the invention.

FIG. 5 is a photograph illustrating the growth of pine seedlings for unfertilized control (left) and with arginine-zeolite according to the invention (right).

FIG. 11A-C illustrate the total biomass of field roots in Norway spruce and *Contorta* pine seedlings as described in Example 7.

DETAILED DESCRIPTION

Figure 1:
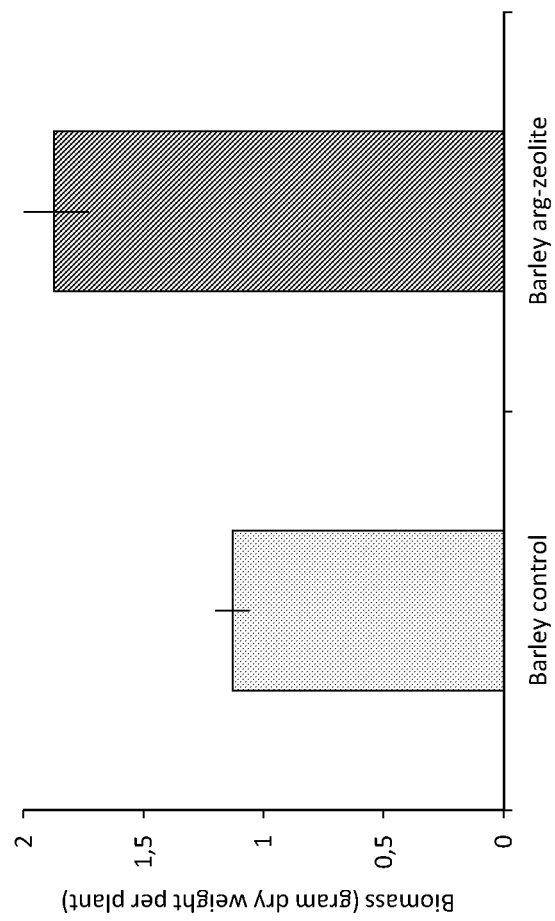
FIG. 1 shows the growth of barley with (right) and without (left) added arginine-charged zeolite according to the invention.

The present invention relates to methods and products which enable fertilized culture of plants with a minimal leakage of nitrogen to the environment. More specifically, the invention may allow for a fertilized plant to access the amounts of nitrogen required for, and used in, its nitrogen metabolism. Thus, the present invention may be regarded as relating to on demand fertilization, wherein the activity of the fertilized plant will control the release of nitrogen from a fertilizer composition.

A first aspect of the invention is a method of promoting the growth of at least one plant, which method comprises
a) Providing a fertilizer composition comprising at least one zeolite, into the pores of which at least one basic L-amino acid has been adsorbed;
b) Adding the fertilizer composition to a medium for plant growth in connection with plantation;
c) Providing for the release of nitrogen from the fertilizer composition during subsequent culture of the plant.

The fertilizer composition may optionally comprise other growth-promoting components, as are well known in this area.

In step b), the addition of fertilizer composition 'in connection' with the plantation includes adding it within a limited period of time before; at the same time as; and/or within a limited period of time after the plantation. In this context, "plantation" may include adding a seed, seedling or plant to the medium for plant growth.

In step c), the skilled person will be able to easily decide on commonly used means and measures to provide for the release of nitrogen. For example, adjusting the pH of the growth medium, or simply providing humidity by watering may constitute measures of step c). In some instances, if the plant is already being cultured under suitable growth conditions, step c) may simply constitute to maintain the plant under such conditions suitable.

According to the present invention, the fertilized plant will have access to organic nitrogen, i.e. nitrogen originating from amino acids, which in the prior art has been shown to have different and in many instances advantageous effects on plant growth as compared to the effect of inorganic nitrogen originating e.g. from ammonium-based fertilizers.

The basic L-amino acid may be selected from the group consisting of L-arginine; L-lysine; and L-histidine. In one embodiment, the basic L-amino acid is L-arginine and/or L-lysine. In this context, it is to be understood that the amino acids used in the present invention may include modified forms of basic L-amino acids, provided that they have the properties of being released as described herein to provide nitrogen to plants. Basic L-amino acids are available from commercial sources. The fertilizer composition may include a mixture of basic L-amino acids.

The zeolite according to the invention may include any natural and/or synthetic microporous aluminosilicate mineral having a three-dimensional framework including corner-sharing $AlO_4$ and $SiO_4$ tetrahedra. As the skilled person will appreciate, the higher the aluminium content of the zeolite, the more negative charges will be available for ion exchange processes, thus enabling a higher content of basic L-amino acid per zeolite.

In one embodiment, the zeolite is a natural zeolite. In a specific embodiment, the zeolite is selected from the group consisting of analcime; chabazite; clinoptilite; erionite; faujasite; ferrierite; heulandite; laumontite; mordenite; philipsite; linde A; and Linde B. In an advantageous embodiment, the zeolite is clinoptilite, which is a zeolite comprising primarily $SiO_2$ and $Al_2O_3$ together with small amounts of CaO and $K_2O$, or a mixture of different zeolites including clinoptilite.

Modified zeolites may be used, provided they present the herein utilized cation-exchanging capacity.

In this context, it is to be understood that the term "a zeolite" is used herein to denote a plurality of zeolite entities of the same kind or form.

The fertilizer composition according to the present invention may be prepared according to previously presented methods, see e.g. the above-discussed Krohn et al. As the skilled person will appreciate, the adsorption of amino acids to zeolites will include ion exchange, but may also include additional mechanisms such as hydrogen bonding. The zeolite or mixture of zeolites may be provided in granular, particulate or any other suitable form.

In step a, the zeolite is advantageously washed after the adsorption of amino acid(s) to avoid any potential toxicity which could result from the release of a relatively large amount of nitrogen at once, if nitrogen loosely attached to the outside of the zeolite is left. Thus, the washing may prevent nitrogen from being released too early i.e. unrelated to the activity of the plant.

Even though it is well known that plants may exude chemicals from roots in order to improve acquisition of mineral nutrients, the difficulty of releasing basic amino acids from zeolites has also been well documented, see F. C. Nachod and Nelson et al, as discussed in the section background above. Consequently, it could have been expected that nitrogen from zeolites in which basic amino acids such as arginine and lysine have been adsorbed would be difficult or even impossible for plants to access, and hence not function as a fertilizer in plant cultivation. Thus, the finding of the present invention that the plants themselves are actually capable not only of releasing the nitrogen adsorbed as basic amino acids in zeolites, but also of controlling the rate thereof to correspond to their activity, is highly unexpected.

As the skilled person will appreciate, according to the invention, the nature and amount of amino acid(s) together with a suitable choice of zeolite may be used as tools in the optimisation of a fertilizer composition for a specific plant and/or growth condition.

Thus, the amount of amino acid(s) i.e. the loading of amino acid on the zeolite should be adjusted in accordance to the kind of plant, the medium for plant growth and humidity in which it will grow and the expected or desired growth rate or growth period. In this application, the adsorption to a zeolite is sometimes denoted charging or loading of the zeolite.

As discussed above, the on demand function according to the present invention may be utilized in the culture of any plant, and as appears from the Experimental part, as the plant itself will direct the release of nitrogen, the zeolite may have any nitrogen content. However, as will be discussed below, specific growth materials may be designed which are optimised in various aspects for specific contexts.

Thus, in one embodiment, the zeolite(s) has a charge of at least 1%, such as at least 2% or at least 3% of nitrogen originating from said basic L-amino acid(s), calculated per total weight of charged zeolite. In one embodiment, the zeolite(s) has a charge of up to 10% of nitrogen originating from said basic L-amino acid(s), calculated per total weight of charged zeolite. Useful ranges may be 1-3%; 2-3%; 1-10%; 2-10%; or 3-10% of nitrogen originating from said basic L-amino acid(s), calculated per total weight of charged zeolite. In this context, the term "charged" means the amount adsorbed in the pores of the zeolites by ion exchange and other optional binding mechanisms. The skilled person will be able to adapt a suitable charge of nitrogen per weight or volume zeolite depending on various factors, such as the container or environment wherein the plant will grow—for a smaller size container, a higher charge may be advantageous, while in other contexts larger soil volumes may require or operate well with a smaller charge of nitrogen per zeolite.

The present invention may for example be used in the culture of slowly growing plants, which will require fertilizers during an extended period of growth. By using the present invention, such plants may successfully be cultured with fewer fertilizer additions, and less leakage of nitrogen to the environment, than the prior art. The invention thus enables addition of large amounts of fertilizer, for prolonged and sustained nutrition of slowly growing plants.

In one embodiment, the plant to be fertilized is a conifer tree, such as a member of the order Pinales, including members of the family Cupressaceae, such as *Cupressus* spp., *Juniperus* spp., *Sequoia* spp., *Sequoiadendron* spp.; members of the family Taxaceae (*Taxes* spp.) and members of the family Pinaceae, such as the genera *Abies* spp., *Cedrus* spp., *Larix* spp., *Picea* spp., *Pinus* spp., *Pseudotsuga* spp., *Tsuga* spp. In an advantageous embodiment, the plant to be fertilized is a member of the genera *Pinus* or *Piceae* such as the species *Pinus sylvestris, Pinus contorta* or *Picea abies*.

In another embodiment, the plant to be fertilized is a deciduous tree, including hybrids and cultivars, such as acacia (Acacia spp.), alder (*Alnus* spp.), birch (*Betula* spp.), hornbeam (*Carpinus* spp.), hickory (*Carya* spp.), chestnut (*Castanea* spp.), beech (*Fagus* spp.), walnut (*Juglans* spp.), oak (*Quercus* spp.), ash (*Fraxinus* spp.), poplar (*Populus* spp.), aspen (*Populus* spp.), willow (*Salix* spp.), *eucalyptus*

(*Eucalyptus* spp.), sycamore (*Platanus* spp.), maple (*Acer* spp.), mahogany (*Swietenia* spp.) and sweet gum (*Liquidambar* spp.).

In a specific embodiment, the plant to be fertilized is a woody plant whose leaves can be eaten as leaf vegetables include *Adansonia, Aralia, Moringa, Morus*, and *Toona* species.

In yet another embodiment, the plant to be fertilized is a fruit bearing plant, including hybrids and cultivars, such as apple (*Malus* spp.), plum (*Prunus* spp.), pear (Pyres spp.), orange (*Citrus* spp.), lemon (*Citrus* spp.), kiwi fruit (*Actinidia* spp.), cherry (*Prunus* spp.), grapevine (*Vitis* spp.), fig (*Ficus* spp.) and banana (*Musa* spp.). Other fruit bearing plants include shrubs such as bilberry or blueberry (*Vaccimium* spp.), and bromeliad such as pineapple.

Orchids, such as Vanilla or Phalaenopsis, succulents, such as a cactus (cactaceae) and euphorbias (Euphorbiaceae) are further examples of relatively slowly growing plants which may be fertilized according to the invention.

The method according to the invention may also be used for the culture of faster growing plants, which commonly have a demand for nitrogen during a shorter growth period. Thus, in one embodiment, the plant is an annual or a biennial, and the zeolite has a charge of about 1-10% of nitrogen originating from said basic L-amino acid(s), calculated per total weight of charged zeolite.

In one embodiment, the plant to be fertilized is a monocot plant, including hybrids and cultivars, which plant is selected from the group consisting of barley (*Hordeum vulgare*), maize (*Zea mays*), rice (*Oryza sativa*), sorghum (*Sorghum* spp.), wheat (*Triticum*), finger millet (*Eleusine coracana*), foxtail millet (*Setaria italica*), pearl millet (*Pennisetum glaucum*), proso millet (*Panicum miliaceum*), oats (*Avena sativa*), triticale, a hybrid of wheat, fonio (*Digitaria*), onions (*Allium* spp.), pineapple (*Ananas* spp.), rye (*Secale cereale*), amaryllis, bamboo (Bambuseae), banana (Musaceae), bluebells (Hyacinthoides), cannas, daffodils (*Narcissus*), ginger family (Zingiberaceae), irises (Iris), lilies (*Lilium*), orchids (Orchidaceae), palm (Arecaceae), sugarcane (*Saccharum* spp.) and tulips (*Tulipa*).

In an advantageous embodiment, the plant to be fertilized is a grass such as a member of the family Poaceae, including hybrids, and cultivars selected from the group consisting of bluegrass (*Poa* spp.), bentgrass (*Agrostis* spp.), ryegrasses (*Lolium* spp.), fescues (*Festuca* spp.), feather reed grass (Calamogrostis spp.), tufted hair grass (*Deschampsia* spp.), cluster fescue (*Festucaparadoxa* spp.), zoysia grass (*Zoysia* spp.), bermuda grass (*Cynodon* spp.), St. Augustine grass (*Stenotaphrum secundatum*), bahia grass (*Paspalum* spp.), centipede grass (*Eremachloa* spp.), carpet grass (*Axonopus* spp.) and buffalograss (*Bouteloua* spp.). An advantageous grass to be fertilized according to the invention is a grass from the genera *Poa* or *Festuca*.

In another embodiment, the plant to be fertilized is a dicot (dicotyledons) plant including hybrids, and cultivars of plants selected from a group consisting of alfalfa (*Medicago sativa*), *Medicago truncatula*, beans (*Phaseolus*), beet (*Beta vulgaris*), buckwheat (*Fagopyrum esculentum*), carob (*Onia siliqua*), chick pea (*Cicer arietinum*), cotton (*Gossypium* spp.), cucumber (*Cucumis sativus*), pea (*Pisum sativum*), peanut (*Arachis hypagaea*), pepper (Piper spp.), potato (*Solanum tuberosum*), quinoa, soybean (*Glycine max*), spinach (*Spinacia oleracea*), lettuce (*Lactuca* spp.), squash (*Cucurbita*), sunflower (*Helianthus annuus*), tomato (*Solanum lycopersicum*) and wild soybean (*Glycine soja*). Furthermore, herbs such as basil (*Ocimum* spp.) and oregano (*Origanum* spp.), or ornamental plants belonging to the clade Rosids, such as *Geranium* spp. might be the plant to be fertilized according to the invention.

As appears from the above, a fertilizer composition comprising a zeolite into which basic L-amino acid(s) have been adsorbed may be added to the growth medium before, after or at the same point in time as a seed, a plant or a seedling is placed therein. One advantage of the invention is that it enables the preparation of pre-fertilized materials, which have been provided with fertilizer which will last for an extended growth period and which will be provided to the cultured plant at a rate corresponding to the plant's need thereof i.e. the corresponding to the plant's nitrogen demand linked to its growth activity. In this context, the skilled person will appreciate that 'correspond to' is an approximation, and that some superfluous nitrogen could still be released to the environment. However, any such release would be small enough to be negligible from a leakage point of view.

A second aspect of the invention is fertilizer composition, which comprises at least one zeolite, into the pores of which at least one basic L-amino acid has been adsorbed, optionally together with other growth-promoting components. Other growth-promoting agents may be selected from the group consisting of potassium, phosphorous, metal ions, vitamins, and minerals. Further, a fertilizer composition according to the invention may include commonly used additives to provide for a suitable physical format, such as a granulate or particulate material. Suitable particle size may depend on the context wherein the plant is to be cultured, and may easily be decided by the skilled person in this area.

Thus, in one embodiment, the present invention is a growth-supporting material, which comprises any conventional medium for plant growth combined with at least one zeolite, into the pores of which at least one basic L-amino acid has been adsorbed. Consequently, due to the contents of organic nitrogen adsorbed in the pores of zeolite(s), this embodiment may be regarded as a pre-fertilized growth material.

All details, embodiments and examples provided above regarding e.g. the amino acid(s) and amounts thereof, zeolite (s), plants and growth medium according to the invention will apply to this second aspect as well.

The growth-supporting material comprised of any conventional growth medium combined with zeolite(s), into the pores of which amino acid(s) have been adsorbed may be provided in any suitable format. Thus, it may be provided in bags of growth medium, as particles or granulate, or in jiffy pots. The present materials may be provided in formats suitable for private use as well as in larger formats more adapted to commercial scale. Some formats including the present invention may be specifically adapted to automation.

In one embodiment, the growth-supporting material according to the invention is provided in a biodegradable container. The biodegradable container may be a peat pot, or similar.

In another embodiment, the growth-supporting material according to the invention is a pad arranged for the plantation of seeds or seedlings. In this context, such a pad could be compressed and optionally dried growth medium.

The growth-supporting material according to the invention may be used in any context where the release of nitrogen is desired at a rate corresponding to the nitrogen requirement for growth of a cultured plant, such as for agricultural or horticultural purposes, for consumer use at homes or in gardens, in greenhouses as well as in outdoors tree plantations.

A third aspect of the invention is the use of at least one zeolite, into the pores of which at least one basic L-amino acid has been adsorbed, as a fertilizer.

The third aspect of the invention also includes the use of a growth-supporting material as described above in the fertilized culture of at least one plant.

All details, embodiments and examples provided above regarding e.g. the amino acid(s) and amounts thereof, zeolite(s), plants, formats and growth media etc. will apply to this third aspect as well.

In an advantageous embodiment of the use according to the invention, the plant is a perennial and the zeolite has a charge of about 1-3% of nitrogen originating from said basic L-amino acid(s), calculated per total weight of charged zeolite.

In a specific embodiment of the present use, the plant is a conifer tree, such as a member of the family Pinaceae, e.g. a *Pinus* or *Picea*.

In one embodiment, the method according to the invention; a fertilizer composition according to the invention; or a growth-promoting material according to the invention is used in the culture of at least one mycorrhizal plant.

In one embodiment, the plant is capable of symbiotic association with of a fungus. The fungus may capable of forming fruit bodies, such as fruit bodies used as food and in cooking. Thus, the present invention may advantageously be used in large scale culture of fungi fruit bodies and any mushrooms for use in the food industry.

The fungi may also enhance the performance of the cultured plant or seedling. Thus, the invention enables rapid growth of a plant but with sustained or improved symbiotic relationship to one or several mycorrhizal fungi. These mycorrhizal fungi will subsequently, and over extended periods of time, improve the performance of the plant or seedling once planted in soil, e.g. in a field setting such as an agricultural field or in a forest regeneration area.

The present invention includes any combination of embodiments described in the context of a specific aspect above, as long as the skilled person will recognize such as combination as fulfilling one or more of the objectives according to the invention.

DETAILED DESCRIPTION OF DRAWINGS

Figure 2:
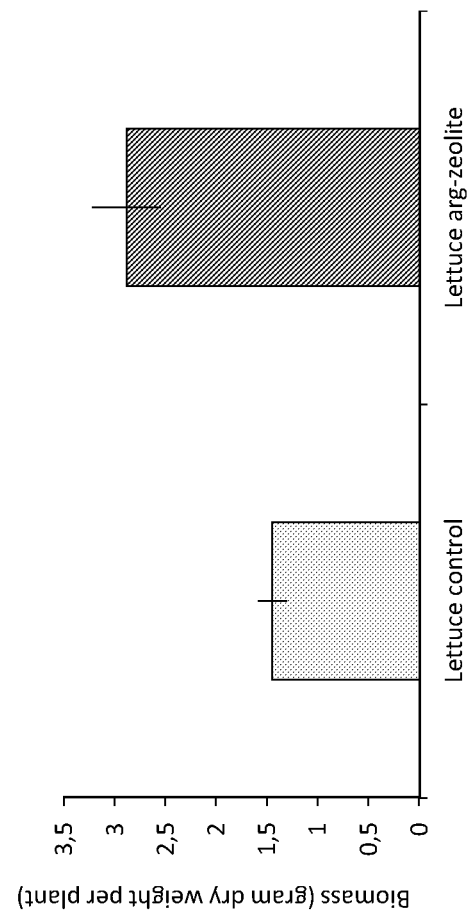
FIG. 2 shows the growth of lettuce with (right) and without (left) added arginine-charged zeolite according to the invention.

FIG. 1 shows the biomass in gram dry weight per plant of barley. The bar to the left is a control with no added zeolite; while the bar to the right is the result of growth according to the invention with added arginine-charged zeolite according to the invention. More specifically, the nitrogen content was 2% in the form of L-arginine, in total 20 mg N per pot. Plants were grown in pots filled with soil and harvested after 8 weeks, as described in more detail in Example 3. Bars represent mean values±standard error (n=18-21) of dry weight of whole plants, including root and shoot. As appears from FIG. 1, the biomass obtained when the arginine-charged zeolite according to the invention was used is almost double as compared to the control. FIG. 2 shows the biomass in gram dry weight per plant of lettuce. The bar to the left is a control with no added zeolite; while the bar to the right is the result of growth according to the invention with added arginine-charged zeolite. More specifically, the nitrogen content was 2% in the form of L-arginine, in total 20 mg N per pot. Plants were grown in pots filled with soil and harvested after 8 weeks, as described in more detail in Example 3. Bars represent mean values±standard error (n=18-21) of dry weight of whole plants, including root and shoot.

Figure 3:
FIG. 3 is a photograph illustrating the growth of lettuce and barley for unfertilized control (left) and with arginine-zeolite according to the invention (right).

FIG. 3 is a photograph illustrating the increased biomass presented in FIGS. 1 and 2, obtained according to Example 3. More specifically, FIG. 3 shows the growth of lettuce (*Lactuca sativa*) and barley (*Hordeum vulgare*) on arginine-charged zeolite for unfertilized control (left) and arginine-zeolite (20 mg N) (right). The growth of the plants to the right has clearly been enhanced by the addition of amino acid-charged zeolite according to the invention.

FIG. 4 shows the shoot growth and total nitrogen content in needles of Scots pine seedlings with (right) and without (left) added arginine-charged zeolite (nitrogen content 2% in the form of L-arginine, in total 40 mg N per pot), as described in Example 4. Plants were pre-grown in a conifer nursery and arginine-charged zeolite was added to the root-clump just before planting in the field. Plants were harvested after one growing season (3 months) and the dry weight of shoots and total nitrogen content in needles were determined. In FIG. 4A, the growth is illustrated by the shoot biomass, and bars represent mean values±standard error (n=25) of dry weight of whole plants (root and shoot). It appears clearly that the arginine-charged zeolite used according to the invention results in a substantial increase of shoot biomass. In FIG. 4B, the total nitrogen content in needles is shown as evidence of the pine's utilization of nitrogen originating from the zeolite.

FIG. 5 is a photograph illustrating the growth of pine seedlings coated with arginine-charged zeolite in a field trial, as described in Example 5, for unfertilized control (left) and arginine-zeolite (40 mg N) (right). It appears clearly that the arginine-charged zeolite used according to the invention had a growth-enhancing effect.

Figure 6:
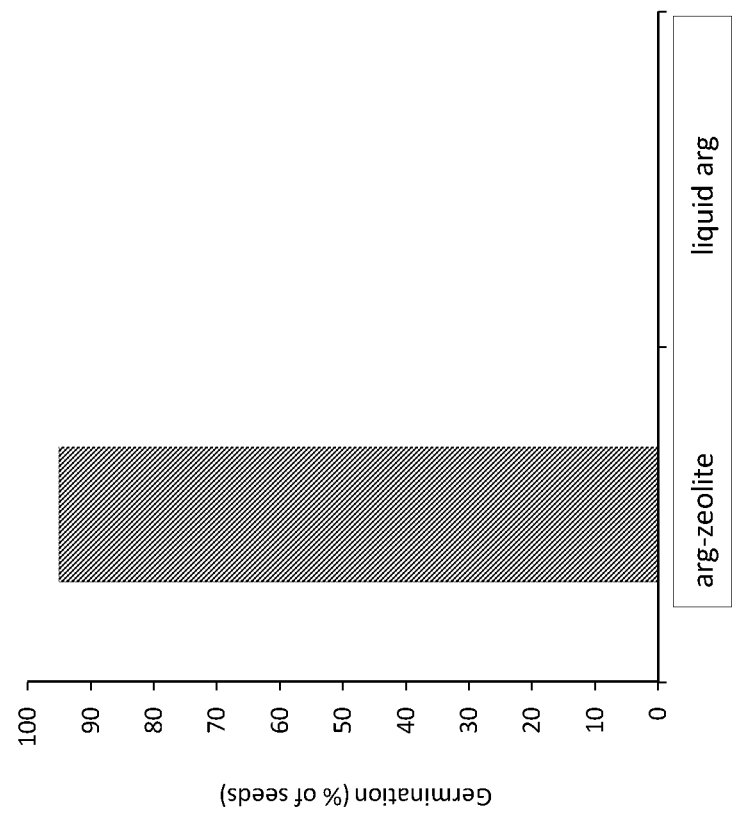
FIG. 6 shows the germination of pine seeds on arginine-charged zeolite according to the invention (left) or with a commercially available fertilizer (right).

FIG. 6 shows how the germination of pine seedlings (*Pinus sylvestris*) fertilized with arginine-charged zeolite (left) according to the invention reached almost 100% at a point in time when the commercially fertilized (right) seedlings had not yet indicated any germination. The latter were fertilized with an amino acid-based, non-zeolite fertilizer.

Figure 7:
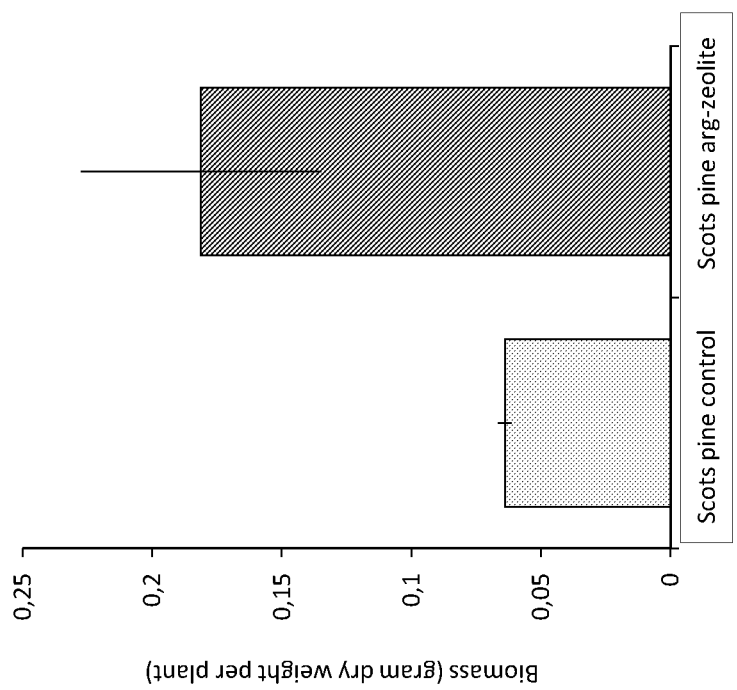
FIG. 7 shows the growth of pine seedlings on arginine-charged zeolites according to the invention (right) and a control without zeolites (left).

FIG. 7 shows the growth of pine seedlings (*Pinus sylvestris*) with (right) or without (left) added charged zeolite (nitrogen content 2% in the form of L-arginine, in total 20 mg N per pot). Plants were grown in pots filled with peat and harvested after 12 weeks. Bars represent mean values, standard deviation (n=10) of dry weight of whole plants (root and shoot). The substantial difference in biomass of the pine cultured according to the invention clearly illustrates the effect of the present invention.

Figure 8:
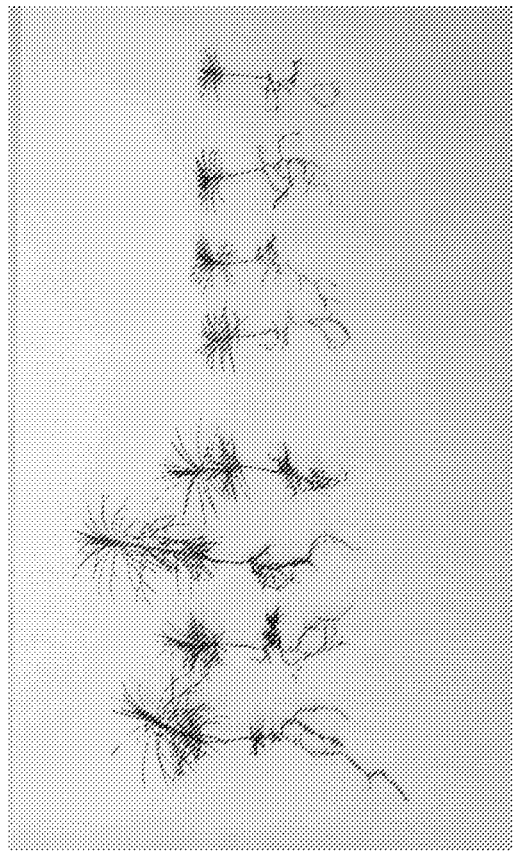
FIG. 8 is a photograph illustrating the growth of pine seedlings with arginine-charged zeolite according to the invention, with (left) and without (right) mycorrhiza.

FIG. 8 shows the growth of pine seedlings (*Pinus sylvestris*), and is more specifically a photograph of the growth with arginine charged zeolite with (left) or without (right) mycorrhiza. The seedlings grown with mycorrhiza are clearly larger than those without it, again illustrating the effect of the invention.

Figure 9:
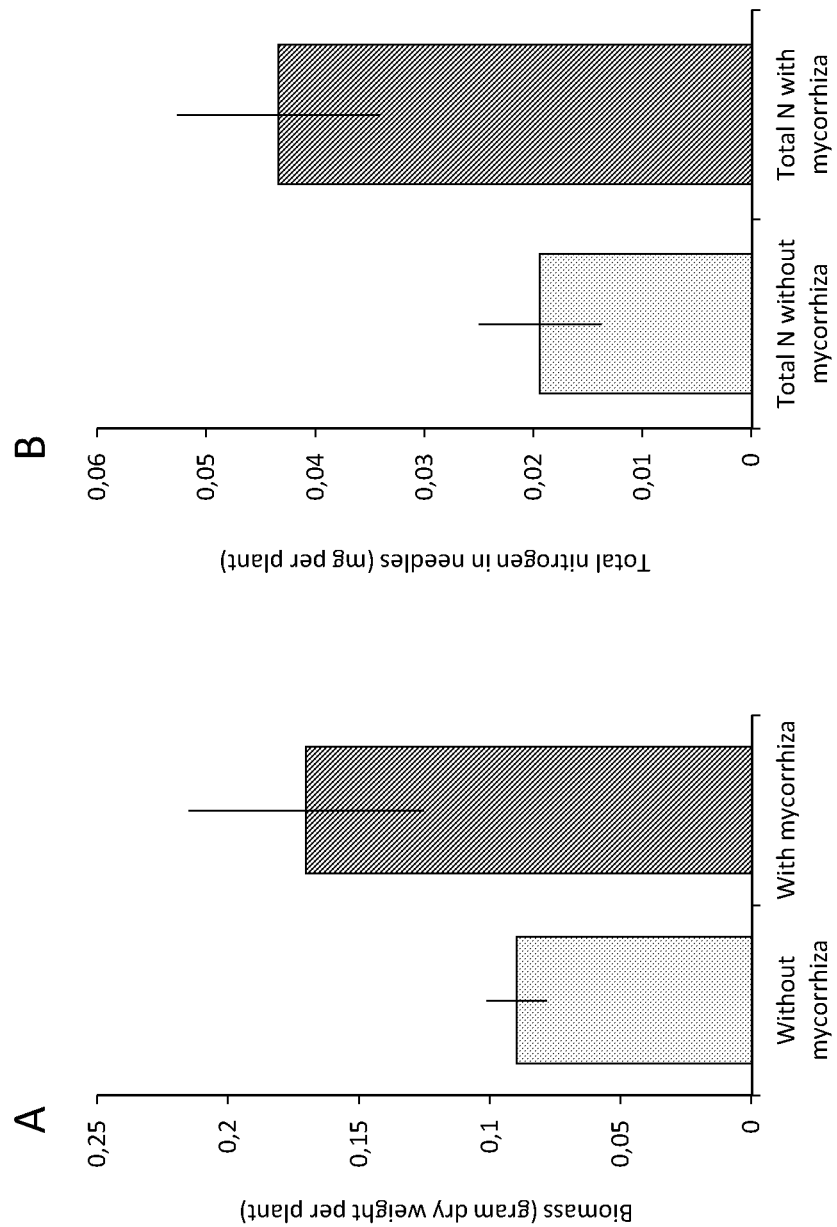
FIG. 9A-B shows the growth by biomass and total nitrogen, respectively, in needles of pine seedlings on arginine-charged zeolites with (right) or without (left) mycorrhiza.
FIG. 9C is a panel of four photographs of pine seedlings with added mycorrhiza (1 and 2) and without added mycorrhiza (3 and 4).

FIG. 9 shows the growth of pine (*Pinus sylvestris*) seedlings and total needle nitrogen content on arginine charged zeolite with or without mycorrhiza (nitrogen content 2% in the form of L-arginine, in total 20 mg N per pot). Plants were grown in pots filled with peat and harvested after 12 weeks. Bars represent mean values, standard deviation (n=10) of dry weight of whole plants (roots and shoot). More specifically, FIG. 9A shows the dry weight biomass of pine without (left) mycorrhiza and with (right) mycorrhiza; while FIG. 9B shows the total nitrogen (mg N/dry weight) in needles without (left) mycorrhiza and with (right) mycorrhiza, as evidence of the pine's utilization of nitrogen originating from the zeolite. It appears clearly that the arginine-charged zeolite combined with mycorrhiza according to the invention results in a substantial increase of biomass.

Figure 9C:
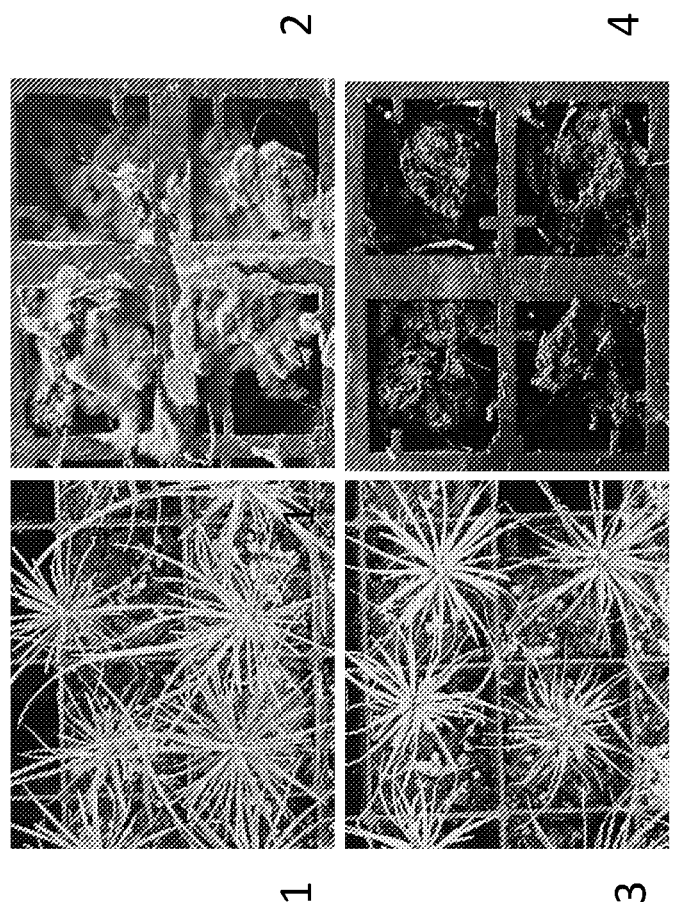

FIG. 9C is a panel of four photographs illustrating the growth of pine seedlings with and without added mycorrhiza. More specifically, the indicated boxes 1-4 shows in indicated area 1 the growth of pine seedlings with mycorrhiza; in area 2 a picture of the bottom of a cassette with mycorrhiza; in area 3 the growth of pine seedlings without added mycorrhiza; and in area 4 a picture of the bottom of a cassette without added mycorrhiza. It should be noted that the pine plantlets in 1 are very green and vigour, whereas the plantlets in area 3 have a yellowish tone and suffer from nitrogen deficiency.

Figure 10:
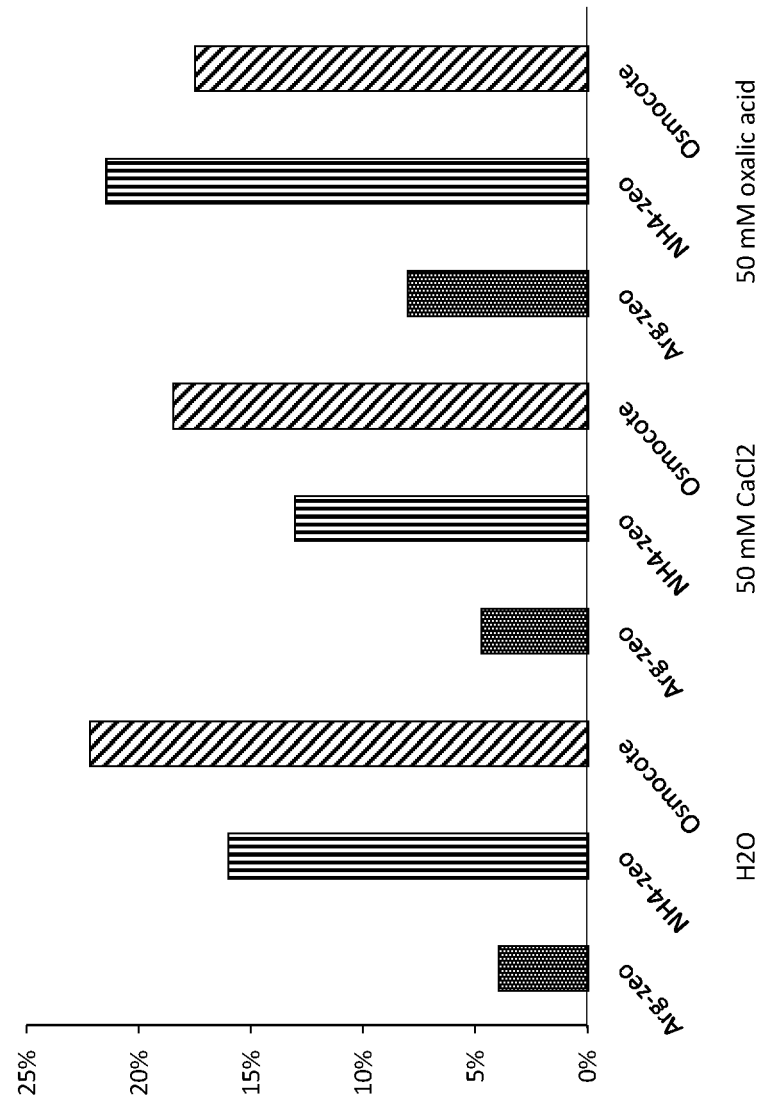
FIG. 10 illustrates the mass loss during extraction after 18 days of growth promoted according to the invention as compared to the growth with a prior art fertilizer.

FIG. 10 illustrates the mass loss during extraction after 18 days of growth promoted according to the invention as compared to growth with a prior art fertilizer (Osmocote), as described in Example 2 below. In summary, FIG. 10 shows that arginine binds strongly to zeolite even when washed with water ($H_2O$) (to the left), 50 mM of calcium chloride ($CaCl_2$) (middle) and 50 mM of oxalic acid (right).

FIG. 11 illustrates total biomass growth of field roots in Norway spruce and Contorta pine seedlings as described in Example 7. More specifically, FIG. 11A is a photograph illustrating how field roots are developed, see arrows. In FIGS. 11B and 11C, the field roots biomass are quantified in a graph showing the gram dry weight/plant. The reference seedlings received no nitrogen. By using zeolites loaded with arginine, the growth of field roots are promoted according to the invention.

Figure 12A:
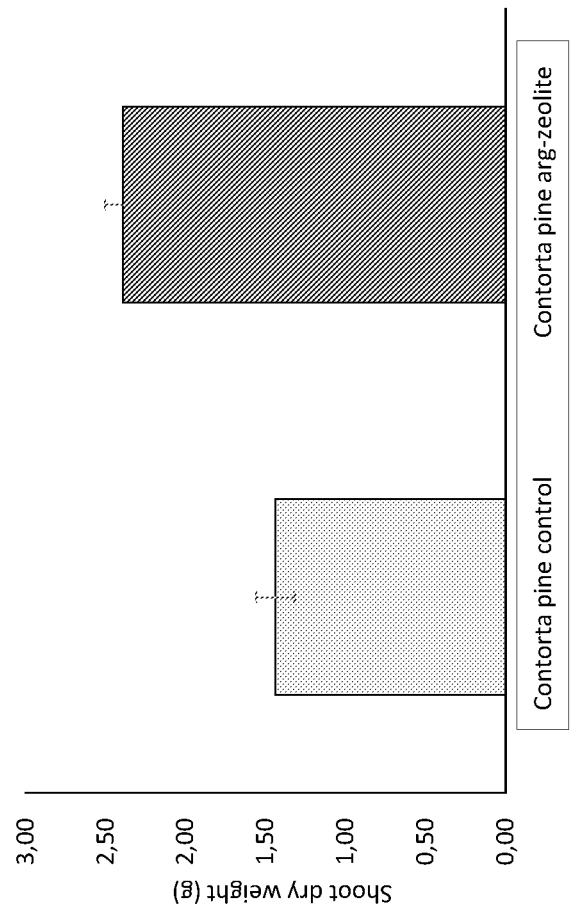
FIGS. 12A-B show the shoot growth increase in Norway spruce and *Contorta* pine with (right) and without (left) arginine-charged zeolites obtained according to Example 7 below.
Figure 12B:
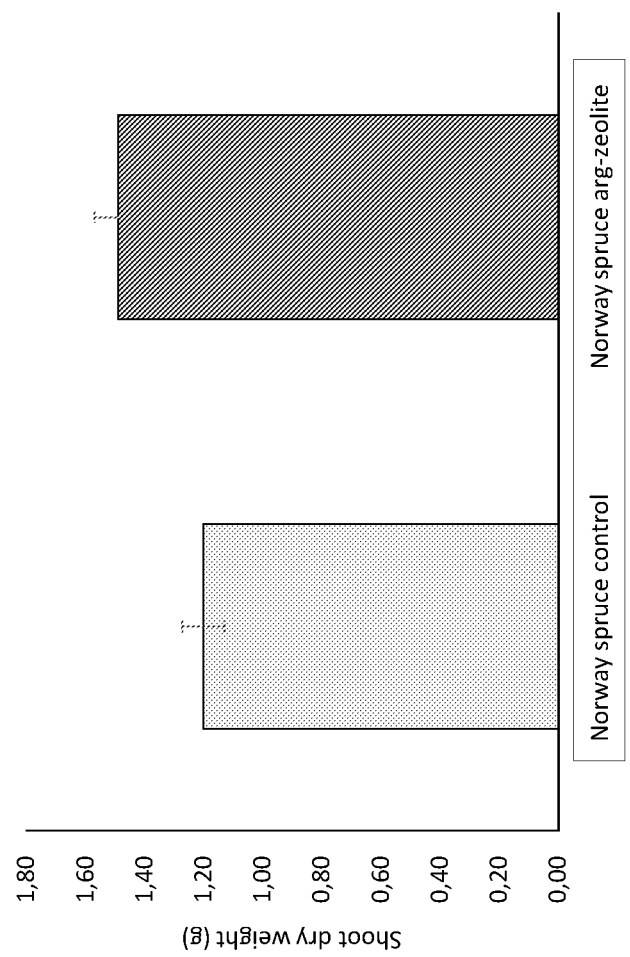

FIGS. 12A-B show the shoot growth increase for Contorta pine and Norway spruce, respectively, when treated with arginine-loaded zeolites according to the invention. More specifically, FIG. 12A shows the shoot dry weight for Contorta pine while FIG. 12B shows the shoot dry weight for Norway spruce. The reference seedlings received no nitrogen, according to Example 7 below. This figure illustrates that arginine-charged zeolites supplied to the roots of seedlings in accordance with the invention had a superior long term effect on the growth of field roots (FIG. 11 and the shoot growth (FIG. 12) as compared to the reference.

Figure 13:
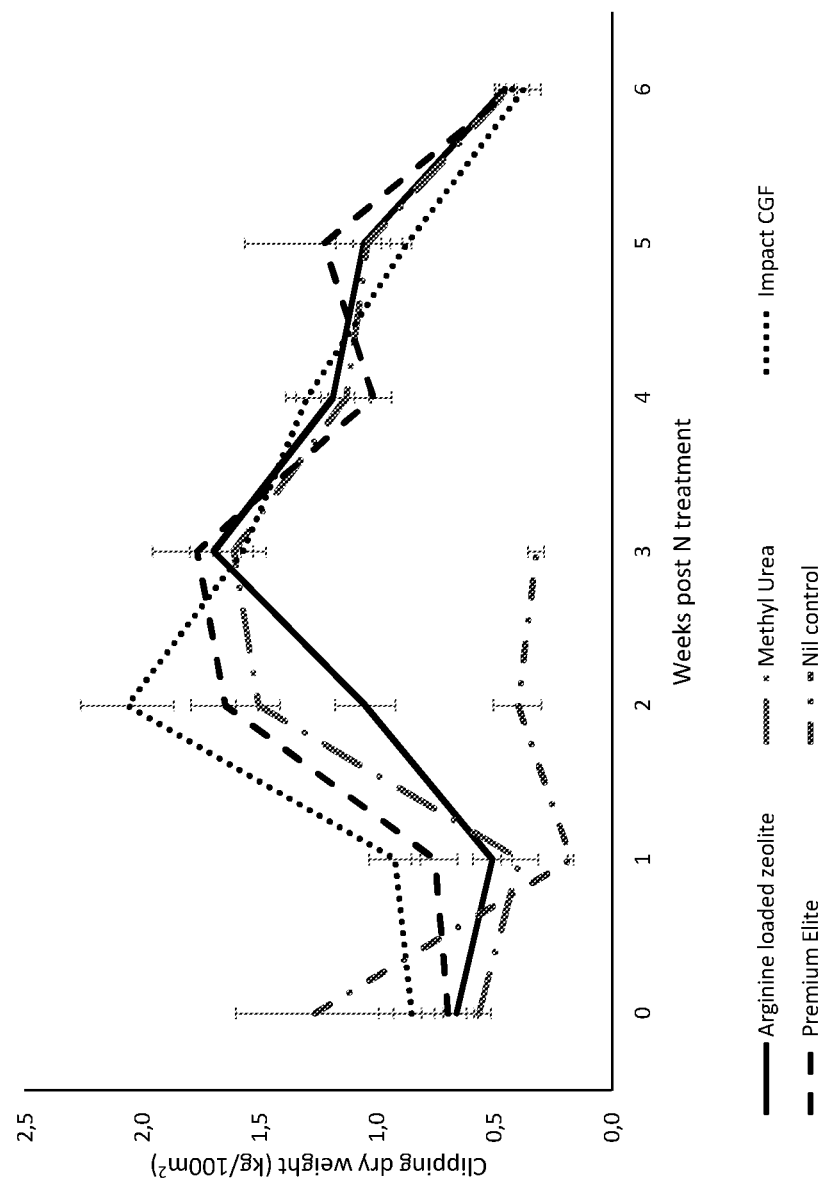
FIG. 13 shows the dry weight of grass clipping of a fairway turf treated with arginine-loaded zeolites according to the invention compared to different prior art fertilizers.

FIG. 13 shows the grass clipping dry weights of fairway turf collected weekly to 20 mm above the sandy growth substrate over a 6-week response period to different fertilizers, see Table 1 below. The pre-treatment clipping dry weight was established at week 0. N=4. Error bars=Standard error.

Figure 14:
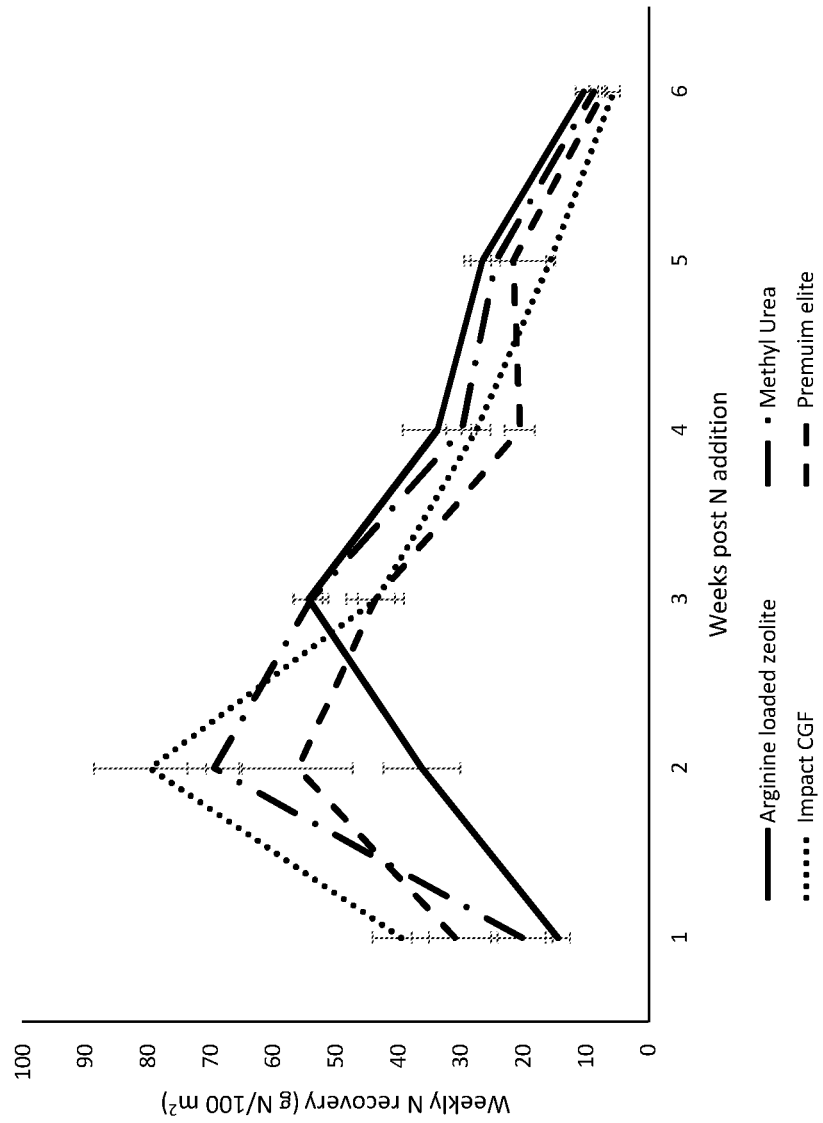
FIG. 14 shows the nitrogen (N) recovery rates in clippings of fairway turf over a 6-week response period to different fertilizers.

FIG. 14 shows the weekly nitrogen (N) recovery rates in clippings of fairway turf over a 6-week response period to different granular fertilizers, see Table 1 below. The pre-treatment clipping dry weight was established at week 0. N=4. Error bars=Standard error.

EXPERIMENTAL PART

The present examples are provided for illustrative purposes only, and should not be perceived as limiting the invention as defined by the appended claims. All references cited below and elsewhere in the present application are hereby included herein via reference.

General Method for the Preparation of Zeolite Charged with L-Amino Acid

Aqueous solutions of L-amino acids in either base or HCl form are prepared and adjusted to a pH in the range of 3-9. Prior to adsorption, the zeolite is rinsed in purified water to remove dust particles and other impurities. The L-amino acid solution is added to the rinsed zeolite and kept under constant stirring at room temperature for 2-4 days. The zeolite is then washed thoroughly in purified water and dried.

Example 1: Preparation of Zeolites Charged with Basic Amino Acids

Example 1(a): Preparation of Arginine-Charged Zeolites

A 0.14 M L-arginine solution was prepared by dissolving 60 g of arginine in 2500 mL of purified water. The pH of the solution was adjusted to 3.5 by addition of concentrated HCl. A natural zeolite of clinoptilite type was obtained from Incal Mineral (Izmir, Turkey) and cleaned from impurities by rinsing with water. 600 g of zeolite was added to the arginine solution and the solution was kept on a rotating table for 3 days at room temperature. After removal of the L-arginine solution, the zeolite was washed three times in purified water and dried in a furnace at 65° C. for 24 hours.

The nitrogen concentration in the charged zeolite was determined using a DeltaV Isotope ratio mass spectrometer and a Flash EA 2000 Elemental Analyzer (both supplied by Thermo Fisher Scientific)

Example 1(b): Preparation of Lysine-Charged Zeolites

A 0.2 M solution of L-lysine was prepared by dissolving 7.3 g of L-lysine hydrochloride (98%, Sigma) in purified water. The resulting solution was adjusted to a pH of 8.5 by addition of a 5 M sodium hydroxide solution.

A natural zeolite of clinoptilite type was obtained from Incal Mineral (Izmir, Turkey). 10 g of zeolite was added to each one of four 50 mL polypropylene test tubes.

The zeolite was rinsed three times in purified water to remove fine particles, and the tubes were thereafter filled to the top with the L-lysine solution. The tubes were kept on a rotating table for 4 days at room temperature. After removal of the L-lysine solution, the zeolite was washed three times in purified water and dried in a furnace at 65° C. for 24 hours. Nitrogen contents were determined using a DeltaV Isotope ratio mass spectrometer and a Flash EA 2000 Elemental Analyzer (both supplied by Thermo Fisher Scientific).

Example 2: Extraction of Nitrogen from Charged Zeolites

As discussed above, basic L-amino acids are very strongly adsorbed to zeolites. To demonstrate that the release of nitrogen from zeolites charged according to the invention is very slow in the absence of a plant, a series of extraction experiments were made. This example was performed using zeolites charged with (a) basic amino acid; (b) ammonium as described in Example 1.

Example 2(a)

Zeolite charged with either L-arginine or L-lysine was immersed in extraction solvents comprised of water, 0.5 mM $CaCl_2$ (pH 5.8) and 0.5 mM oxalic acid (pH 1.6), respectively.

1 g of arginine-zeolite or lysine-zeolite and 10 mL of the respective extraction solvent was added to 15 mL polypropylene test tubes.

In summary this example shows that arginine binds strongly to zeolite when washed with water ($H_2O$), calcium chloride and oxalic acid, see FIG. 10.

Example 2(b) and (c)

Parallel experiments were made with ammonium-containing zeolites prepared in a similar way as the amino acid zeolites and a commercial slow-release fertilizer containing nitrate and ammonium (Osmocote™, The Scotts Miracle-Gro Company). The ammonium charged zeolite was prepared by washing natural zeolite of clinoptilite type obtained from Incal Mineral (Izmir, Turkey) with water to rinse away impurities. The zeolite grains were then immersed in 2500 mL of 0.2 M ammonium sulphate solution. The zeolite was placed on a rotating table at room temperature (20° C.) for 3 days. The zeolite was then rinsed three times in purified water to get rid of excess ammonium sulphate from the surface of the zeolite. All test tubes were placed on a rotating table at room temperature (20° C.). Samples were taken every third or fourth day and the amino acid (a), ammonium (b) and nitrate concentrations (c) in the samples were measured. After each sampling, the solution in the tubes was replaced with fresh extraction solution.

Example 2(d)

In a further parallel experiment, 20 ml arginine charged zeolites, corresponding to 1% nitrogen, were mixed with 80 ml soil, peat or sand and put in to cassettes that were watered two times a day. No plants were present in these pots. After three months of watering, the soil, peat or sand were washed away and the cleaned zeolites were analysed for nitrogen content. Surprisingly, a big part of intact arginine was still remaining in the zeolites, providing evidence of the sustained release obtainable in accordance with the invention. As the skilled person will appreciate, the choice of growth media may be used as one of the parameters that may affect the rate of release of a certain fertilizer composition, thus providing a flexibility in terms of properties.

Example 3: Greenhouse Experiment with Barley and Lettuce

Natural zeolite of clinoptilite type obtained from Incal Mineral (Izmir, Turkey) charged with arginine (2% nitrogen) were mixed with unfertilized, limed soil (Hasselfors garden) in 80 ml pots to a concentration of 20 mg N per pot (n=20). Barley (*Hordeum vulgare*), lettuce (*Lactuca sativa*) was sown one seed per pot watered and covered with a nonwoven until the seeds were germinated. As a control unfertilized soil was used without addition of arginine-zeolites. After 8 weeks barley and lettuce were harvested and rinsed to remove all soil from the rots. Plants were dried in 65 C.° for 24 h then grinded with a mortal and pistil to a fine powder. Total dry biomass was measured. The total nitrogen content was measured using the carbon/nitrogen analysis method (referred above), see results presented in FIGS. 1 to 3.

Example 4: Greenhouse Experiment with Scots Pine Seedlings

A. Natural zeolite of clinoptilite type (obtained from Incal Mineral (Izmir, Turkey) charged with arginine (2% nitrogen) was mixed with sand in 80 mL pots to a concentration of 20 mg N per pot (n=20). Seeds of Scots pine (*Pinus Sylvestris*) were sown one seed per pot and watered. Plants without addition of arginine-charged zeolites were used as controls. After 12 weeks Scots pine seedlings were harvested and rinsed to remove all soil from the roots. Plants were dried in 65 C.° for 24 hours and ground with a mortar and pistil to a fine powder. Total biomass was measured, and the results are reported in FIG. 4.

B. Natural zeolite of clinoptilite type (obtained from Incal Mineral (Izmir, Turkey) charged with arginine (2% nitrogen) was mixed with sand in 80 mL pots to a concentration of 20 mg N per pot (n=20). Seeds of Scots pine (*Pinus Sylvestris*) were sown one seed per pot and watered. After 4 weeks mycorrhiza was added to the seedlings. Plants without addition of mycorrhiza were used as controls. After 12 weeks pine seedlings were harvested and rinsed to remove all soil from the roots. Plants were dried in 65 C.° for 24 hours and ground with a mortar and pistil to a fine powder. Total biomass and total N was measured as well as the mycorrhiza influence, see FIGS. 8 and 9 for results.

Example 5: Field Trials with Scots Pine Seedlings

Scots pine seedlings (*Pinus Sylvestris*) (n=50) raised in a conifer nursery according to the standard methods were treated with arginine-charged zeolite (2% nitrogen) addition to a concentration of 40 mg N per plant before planting. The seedlings were planted in a clear cut scarified field according to standard methods used for pine forest. Seedlings were planted in mineral soil side by side with pine seedlings not treated with arginine zeolite. After one growing season (3 months), the plants were harvested and washed in water. After drying in 65 C.° for 24 hours the dry weights of the plants were measured, see FIGS. 4 and 5 for results.

Example 6: Germination Test with Scots Pine Seedlings Treated with Arginine-Charged Zeolites Arginine-charged (2% nitrogen) zeolites were mixed with unfertilized limed peat (Hasselfors garden) in 80 mL pots to a concentration of 40 mg N per pot (n=50) compared to 40 mg N of a commercially available, amino acid-based non-zeolite fertilizer mixed in to the peat. Scots pine seeds (*Pinus sylvestris*) were sown one seed per pot and watered. The germination rate was scored after 4 weeks. The results are shown in FIG. 6.

Example 7: Treatment of Norway Spruce (*Picea abies*) and *Contorta* Pine (*Pinus contorta*) with Arginine Zeolite Scots pine, Norway spruce and *Contorta* pine seedlings were raised in a nursery according to standard methods and subsequently planted in mineral soil. Half of the seedlings did not get any additional fertilizer and the other half of the seedling got arginine charged zeolites, prepared according to Example 1 supplied to the roots of seedlings and then planted. The total amount of nitrogen added to each seedling was ca 28 mg N. The seedlings were harvested after one growing season and dry biomass of shoot, root and total biomass were recorded. At the same time the biomass of roots emerged during the growing season ("field roots") were measured.

It was surprisingly found that arginine-charged zeolites supplied to the roots of seedlings in accordance with the invention and at the time of plantation had a positive long-term effect on the biomass of field roots FIG. 12 and the growth, FIG. 13.

Example 8: Fairway Turf Response to L-Arginine-Loaded Zeolite

Turf establishment rate from seed is enhanced in response to L-arginine-loaded zeolite fertilizer suggesting that may amino acid loaded zeolite support effective growth of grass species.

In standard greenhouse conditions, 16 h days supplemented, 20-25° C., with artificial light and 8 h night at 15° C. a grass seed mix of 70% *Festuca rubra* spp. and 30% *Poa pratensis*, typically used on golf fairways in temperate and cold climates (referred to as "fairway turf") was established at a seeding rate equivalent to 3 kg seed/100 m$^2$ in 3 Litre pots containing sand with approximately 10% organic matter. In order to support the establishment of full turf coverage in all pots a liquid $NH_4NO_3$ fertilizer was applied at a rate 0.15 kg N/100 m$^2$ six weeks after seeding. Subsequently, four weekly cut-regrowth cycles were performed prior to the commencement of the experimental period where the grass was clipped to 20 mm and the clippings removed.

A single treatment of arginine-loaded zeolites was made at a rate equivalent to 0.5 kg N/100 m$^2$. References treatments matched for total nitrogen level were applied using either a coated ammonium/urea-based commercial product formulated for use on golf fairways, a non-coated methylated urea-based commercial product formulated for use on golf fairways, or chemically pure N-methyl urea. A nil control was also established which did not receive a granular fertilizer treatment during the experimental period. Treatments were replicated four times.

TABLE 1

Fertilizer treatments

| Fertilizer | N-P-K | Nitrogen form | Coating | Nitrogen content (w/w %) |
|---|---|---|---|---|
| Arginine-loaded zeolite | | L-arginine | Non-coated | 2.1 |
| Impact CGF* | 25-5-11 | Urea, ammonium 10.4% (PCSU), 13.4% non-coated urea, 1.2% ammonium | polymer coated sulphur urea (PCSU) and non-coated | 25 |
| Premium elite** | 22-3-16 | Methylated urea | Non-coated | 22 |
| N-Methyl urea | 1-0-0 | Methylated urea | Non-coated | 37.8 |
| Nil N control | — | — | — | 0 |

*Impact CGF is commercial fertilizer sold by Indigrow (UK) Ltd.
**Premium elite is commercial fertilizer sold by Skåne frö AB, Sweden.

Grass clippings were collected to 20 mm above the sandy growth medium and oven dried at 50° C., once prior to fertilizer application (week 0) and then weekly over the subsequent six weeks (week 1-6). Roots were washed and oven dried (at 50° C.) seven weeks after granular fertilizer treatment. The results of this example show that fairway turf exhibited a general increase in production of above ground biomass in response granular nitrogen additions. With the exception of arginine-loaded zeolites where a significant increase in biomass production was observed in the first week after treatment, significant increases in response to all other fertilizer treatments were first observed in the second cut-regrowth cycle. Peak biomass production levels were generally reached in the second or third cut-regrowth cycle in response to all N treatments. Above ground biomass production for a cut-regrowth cycle declined below pre-treatment levels for all fertilizer treatments in the sixth cycle.

A leaf burn stress response commonly referred to as "scorching" was observed in response to uncoated N-Methyl urea, but not in response to arginine loaded zeolites. Weekly N recovery rates were assessed by measuring N content using an elemental analyzer (Flash EA 2000, Thermo Fisher Scientific, Bremen, Germany) and adjusting for clipping biomass (FIG. 2x). Following an initial delay, N was recovered at the highest rate two weeks after N addition in response to all N treatments except for L-Arginine-loaded zeolites which were highest 3 weeks after being applied.

The invention claimed is:

1. A method of promoting the growth of at least one plant, which method comprises
    a) providing a fertilizer composition comprising at least one zeolite, into the pores of which at least one basic L-amino acid has been adsorbed, wherein the zeolite(s) has a charge of about 1-3% of nitrogen originating from said basic L-amino acid(s), calculated per total weight of charged zeolite; and
    b) mixing the fertilizer composition with a medium comprising peat, clay, sand and/or soil for plant growth in connection with plantation,
    wherein release of nitrogen from the fertilizer composition during subsequent culture of the plant planted in the medium is controlled by the plant.

2. A method according to claim 1, wherein the basic L-amino acid is selected from the group consisting of L-arginine and L-lysine.

3. A method according to claim 1, wherein one or more additional growth-promoting components are added to the medium.

4. A method according to claim 1, wherein the zeolite is a natural zeolite.

5. A method according to according to claim 1, wherein the zeolite(s) has a charge of at least 2% of nitrogen originating from said basic L-amino acid(s), calculated per total weight of charged zeolite.

6. A method according to claim 1, wherein the plant is a tree.

7. A method according to claim 6, wherein the tree is a conifer tree.

8. A method according to claim 6, wherein the tree is a member the family Pinaceae.

9. A method according to claim 6, wherein the tree is a member of the genera *Pinus* or *Picea*.

10. A method according to claim 1, wherein the plant is a grass.

11. A method according to claim 10, wherein the grass is a member of the family Poaceae.

12. A growth-supporting material, which material comprises a mixture of a medium comprising peat, clay, sand and/or soil for plant growth and a fertilizer composition comprising at least one zeolite, into the pores of which at least one basic L-amino acid has been adsorbed, optionally together with other growth-promoting components, wherein the zeolite(s) has a charge of about 1-3% of nitrogen originating from said basic L-amino acid(s), calculated per total weight of charged zeolite, and wherein release of nitrogen from the fertilizer composition is controlled by a plant cultured in the medium.

13. A growth-supporting material according to claim 12, which is provided in a biodegradable container.

14. A growth-supporting material according to claim 12, which is a pad arranged for the plantation of seeds.

15. A method according to claim 1, wherein the zeolite with the at least one basic L-amino acid adsorbed in the pores thereof comprises a washed zeolite.

16. A growth-supporting material according to claim 12, wherein the zeolite with the at least one basic L-amino acid adsorbed in the pores thereof comprises a washed zeolite.

17. A method of promoting the growth of at least one plant, which method comprises a) providing the growth supporting material of claim 12; and b) planting a seed or plant in the growth supporting material, wherein release of nitrogen from the fertilizer composition during subsequent culture of the seed or plant planted in the growth supporting material is controlled by the seed or plant.

18. A method according to claim 17, wherein the basic L-amino acid is selected from the group consisting of L-arginine and L-lysine.

19. A method according to claim 17, wherein the plant is a conifer tree.

20. A method according to claim 17, wherein the plant is a grass.

21. A method according to claim 17, wherein the zeolite with the at least one basic L-amino acid adsorbed in the pores thereof comprises a washed zeolite.

22. A method of promoting the growth of a seedling, which method comprises a) applying a fertilizer composition to roots of the seedling, the fertilizer composition comprising at least one zeolite, into the pores of which at least one basic L-amino acid has been adsorbed, wherein the zeolite(s) has a charge of about 1-3% of nitrogen originating from said basic L-amino acid(s), calculated per total weight of charged zeolite, and b) planting the seedling to which the fertilizer composition has been applied in a growth medium comprising peat, clay, sand, and/or soil, wherein release of nitrogen from the fertilizer composition during subsequent culture of the seedling planted in the growth medium is controlled by the seedling in the growth medium.

23. A method of promoting the growth of at least one plant, which method comprises a) providing a plant planted in a growth medium comprising peat, clay, sand, and/or soil, and b) applying a fertilizer composition to the growth medium in which the plant is planted, the fertilizer composition comprising at least one zeolite, into the pores of which at least one basic L-amino acid has been adsorbed, wherein the zeolite(s) has a charge of about 1-3% of nitrogen originating from said basic L-amino acid(s), calculated per total weight of charged zeolite, wherein release of nitrogen from the fertilizer composition during subsequent culture of the plant planted in the growth medium is controlled by the plant.

* * * * *